Patented July 26, 1932

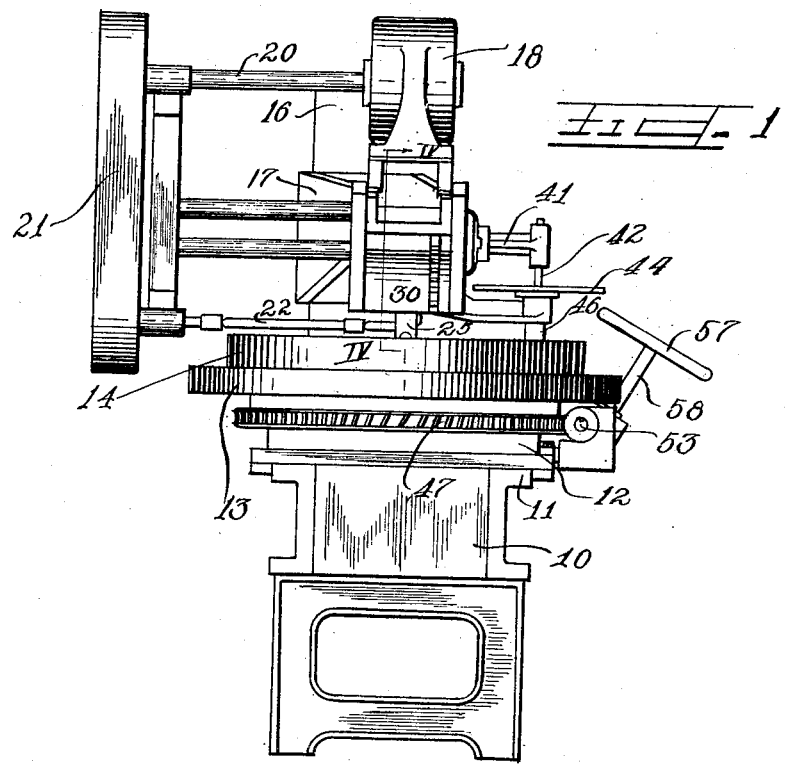
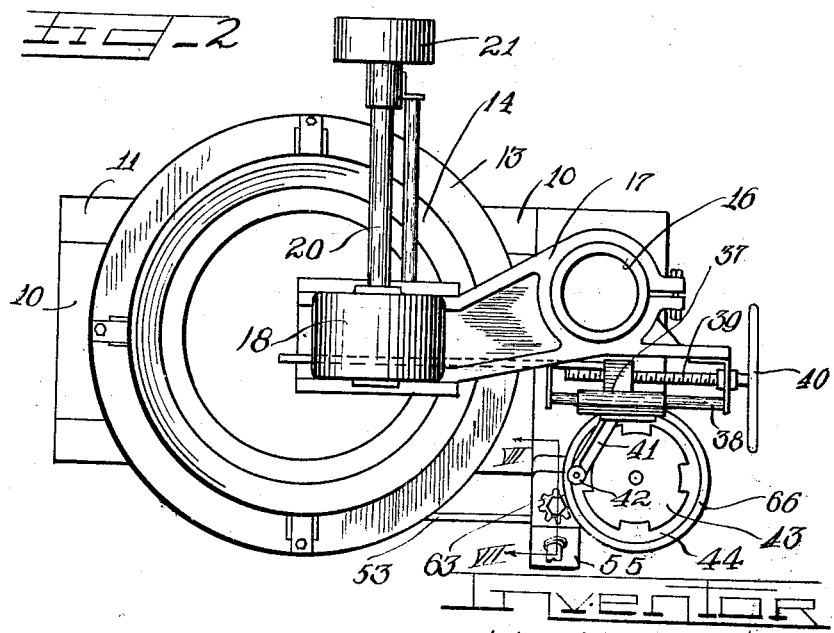

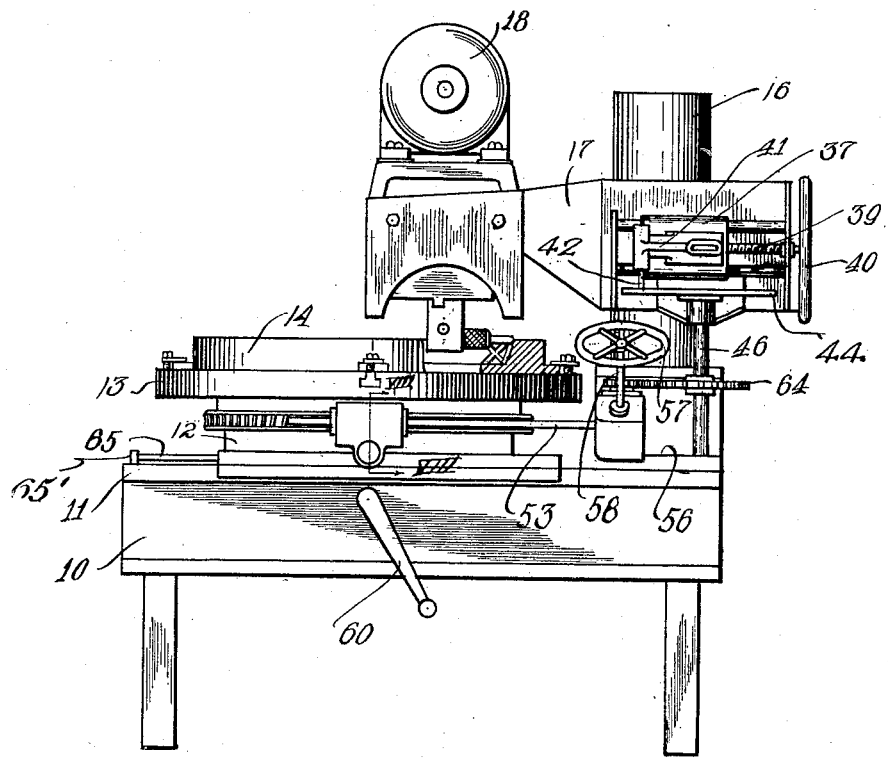

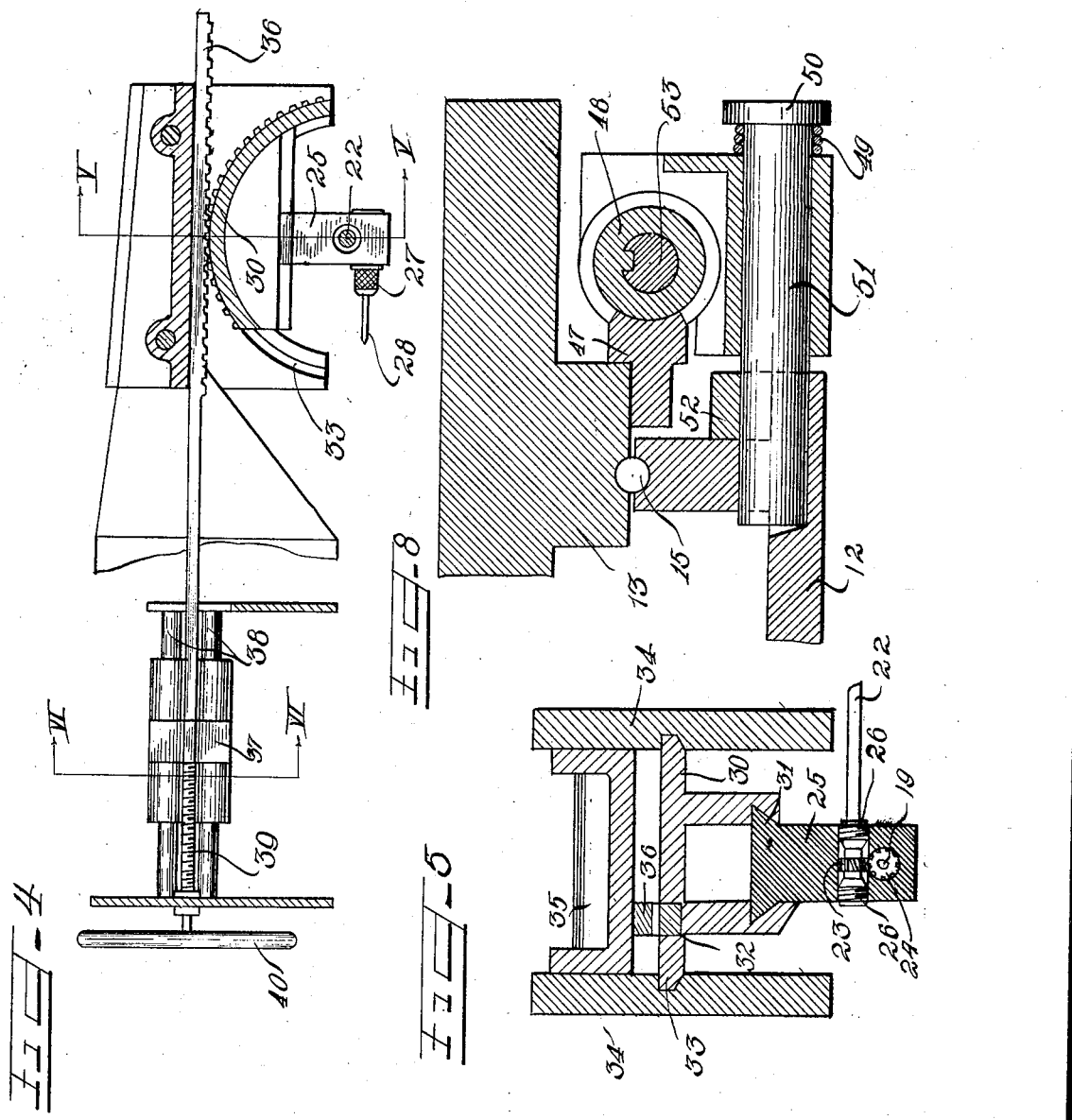

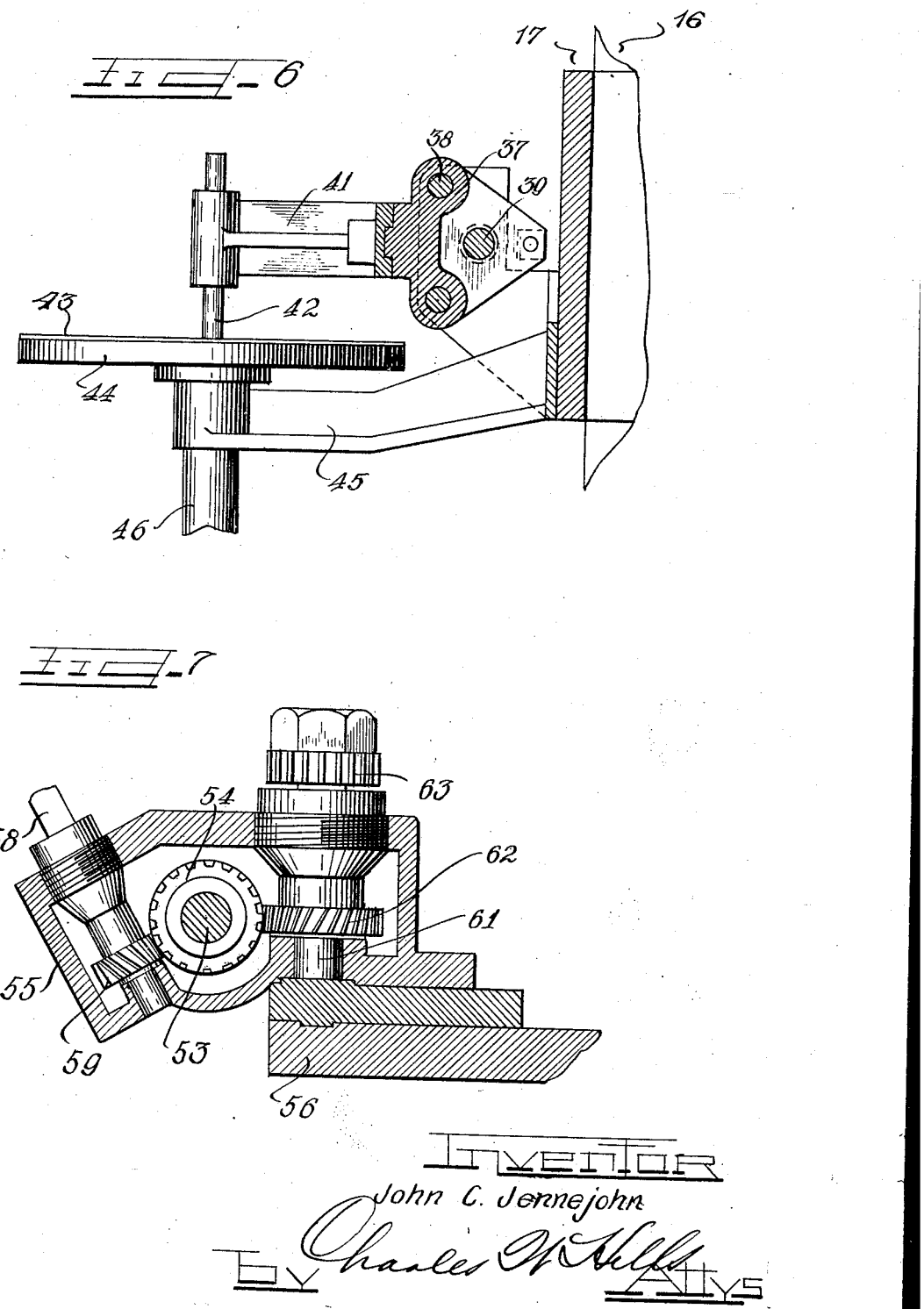

1,868,662

UNITED STATES PATENT OFFICE

JOHN C. JENNEJOHN, OF CUDAHY, WISCONSIN, ASSIGNOR TO UTILITY MANUFACTURING CO., OF CUDAHY, WISCONSIN, A CORPORATION OF WISCONSIN

ENGRAVING MACHINE

Application filed November 1, 1926. Serial No. 145,486.

This invention relates to engraving machines for forming the nonskid tread depressions in tire molds.

It is an object of this invention to provide an improved mechanism for engraving the recurring pattern cycles customarily used in tire molds to produce the peripheral rough or knobby design on tires. I am aware that engraving machines of this general type have been produced heretofore, adapted to engrave one cycle at a time from a pattern with a manual advancement of the work between cycles, but I have produced an improved machine wherein recurring cycles can be produced continuously without intermediate resetting of the mold upon the completion of each cycle.

It is also an object of this invention to provide an improved type of template or guide for producing the desired form of engraving, the template being driven in predetermined relationship to the mold advancing mechanism, and this relationship being variable to suit different lengths of cycles so that one revolution of the template will coincide with a table movement giving the desired cycle length in the tread pattern.

It is another object of this invention to provide a disc type template secured to a table driven from the work table rotating mechanism and to provide a follower therefor operating in predetermined relationship with the cutter tilting mechanism.

It is still another object of this invention to provide an improved cutter mounting and adjusting and pivoting mechanism therefor adapted to permit rapid adjustment of the pivot radius of the cutter to suit various tire mold cross sections; this adjustment determining the crown of the periphery of the nonskid design on the completed tire. As a corollary to the above object, a universal joint in the drive shaft for the cutter is provided to care for the small offsets produced in the adjusting process.

Other and further important objects of this invention will be apparent from the disclosures in the specification and the accompanying drawings.

This invention (in a preferred form) is illustrated in the drawings and hereinafter more fully described.

On the drawings:

Figure 1 is an end elevation of a device embodying the features of this invention.

Figure 2 is a top plan view thereof.

Figure 3 is an elevation of the operating side of the device with a mold in place on the work table and partly broken away.

Figure 4 is an enlarged section of the cutter tilting or pivoting control mechanism.

Figure 5 is an enlarged fragmentary section on the line V—V of Figure 4.

Figure 6 is an enlarged fragmentary section on the line VI—VI of Figure 4.

Figure 7 is a fragmentary sectional detail on the line VII—VII of Figure 2.

Figure 8 is a fragmentary sectional detail on the line VIII—VIII of Figure 3.

As shown on the drawings:

The machine as a whole comprises a base 10 having sliding ways 11 for the support 12 for a rotating or indexing table 13 to which the mold halves 14, to be engraved, are clamped in centered relationship, this table 13 being preferably supported on ball bearings 15, although in other respects, it greatly resembles the table of a vertical boring mill. The superficial resemblance is further carried out by the vertical column 16 from which the engraving tool proper is supported by means of the vertically adjustable column bracket 17.

The bracket 17 has a motor 18 mounted thereon which furnishes the power for rotating the engraving tool spindle 19 through the shaft 20, transmission 21 and universal joint shaft 22 which carries a helical gear 23 meshing with a similar gear 24 on the spindle 19. The spindle 22 is held in place in its supporting block 25 by means of thrust bushings 26 and carries a chuck 27 in which various forms of engraving tools 28 may be inserted. The particular form of these tools resembles an end mill, either cylindrical or conical according to the desired form of the flanks of the tread projections. The spindle supporting block 25 is adjustably mounted on an arcuate segment 30 by means of a dovetail slide 31, the segment 30 carrying a quadrant gear or curved rack 32 and being mounted in suitable arcuate grooves 33 in the side members or plates 34 forming a part of the column bracket 17; a spacer block 35 for the plates also forming a platform for the motor 18. Hereinafter, for purposes of brevity, the arcuate segment 30 and curved rack 32 will be referred to as a unit under the name quadrant gear.

The quadrant gear is moved in its grooves 33 by means of a rack 36 which extends alongside the bracket 17 and is secured to a carriage 37 sliding on guides 38, the carriage being advanced and retracted by means of the screw 39 and hand wheel 40.

An outstanding bracket 41 is adjustably positioned on the carriage 37 and a pointer or follower 42 depends therefrom to serve as a guide in following the contours of a suitable template or guide disc 43 which is designed to produce the desired tread pattern or cycle. The disc 43 is supported on a horizontal plate 44 rotatably mounted in a bracket 45 by means of a depending shaft 46. The drive for this shaft will be described in connection with the work table rotating mechanism.

The work table carries a ring worm gear 47 with which a worm 48 meshes, the worm being held and urged into solid contact therewith without backlash by means of a spring 49 beneath the head 50 of a pin 51, the inner end of which is clamped in a suitable recess in the work table support 12 by means of a cap 52. The worm is slidably mounted on a shaft 53 to permit a longitudinal shift of the work table carriage and the driving end of this shaft carries a gear 54 and is supported in a gear box 55 which is bolted to a shelf 56 on the bed 10, the box being shiftable along the shelf for purposes which will later be explained. A handwheel 57 on the inclined shaft 58 serves to rotate the worm shaft 53 by means of the gear 59 meshing with the gear 54 thereon, this handwheel governing the rotation of the mold past the cutter while the hand wheel 40 feeds the cutter up and down. It will thus be evident that a varying combination of the movements of these two handwheels will produce any desired pattern in the mold in conjunction with the carriage advancing and retracting mechanism of which only the lever 60 has been shown as it closely resembles the well known mechanism of a hand milling machine table traverse.

The gear box 55 has a vertical stub shaft 61 mounted therein, the inner end carrying a gear 62 engaging with the worm shaft gear 54. The outer end of this shaft 61 carries a pinion 63 engaging a gear 64 on the shaft 46 depending from the plate 44 whereby the table carrying the profile template 43 is rotated as a function of the work table rotation. The gears 63 and 64 form one pair of a change gear set and as previously stated, the gear box 55 is shiftable on its supporting shelf to vary the center distance for different gear sets. By providing different sets of gears with different ratios, one rotation of the profile disc 43 will correspond with varying angular work table movements, so that a complete rotation of the disc 43 may be made to produce a complete tread design cycle of varying lengths. It is thus possible to produce a profile disc having the contours to produce a design cycle so that the machine may be operated over successive cycles without resetting the work after each cycle if so desired.

In the operation of this machine, a mold half is first centered on the work table and the bracket 17 adjusted vertically to bring the cutter into correct relationship with the mold. The horizontal shift of the work table support is then adjusted to produce the required depth of cut, an adjustable stop 65 being arranged to maintain this depth adjustment after each retraction of the carriage as when producing a series of isolated knobs where the mold and carriage would have to be shifted away to clear the cutter after finishing each isolated depression. This stop comprises an adjustable rod, one end of which is adjustably threaded into a lug 65' secured to the top of base 10 (Figure 3), and the other end of which is arranged so as to abut one end of the table support 12. The peripheral edge of the template or guide disc 43 is designed with a configuration such that by relatively moving the disc and pointer in such a manner as to keep the pointer against the edge of the disc, the desired tread pattern will be engraved in the mold. When the pointer is moved over a diameter of the disc, vertical grooves are produced in the mold; and, when the relative movement is such that the pointer travels concentrically of the disc, horizontal grooves are produced in the mold. Relative movement of the disc and pointer in directions intermediate the diametral and concentric movements will produce intermediate forms of grooves. In case isolated depressions are to be produced, an outside ring 66 is provided to prevent undue outward movement of the follower 42 which would bring the cutter up to the top edge of the mold.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a machine for engraving molds, a rotatable support, a rotatable profile disc, a support for said disc, means for rotating the work support and disc support in predetermined relationship, a tool support having a tilting mounting relatively to said work support, means for tilting said tool support, and a follower for said profile disc associated with the tilting means for controlling the tilting of said tool support.

2. In a mold engraving machine, a movable work support, a pattern disc mounted to have a corresponding movement proportional to the work support, means for simultaneously moving said work support and pattern disc, a rotatable quadrant gear, a cutting tool carried by and movable with said gear, said tool being shiftable toward and away from the center of rotation of said gear so that the movement of the tool will be about a different center than that of the gear, a follower supported for movement relative to said disc, and means for simultaneously rotating said gear and moving said follower.

3. In a mold engraving machine, a movable work support, a pattern disc mounted to have a corresponding movement proportional to the work support, means for simultaneously moving said work support and pattern disc, a rotatable quadrant gear, a cutting tool carried by said gear and arranged for adjustment in such a manner that its movement will be eccentric relative to the gear to enable the tool to effect a cut of varying depth, a follower supported for movement relative to said disc, and means for simultaneously rotating said gear and moving said follower.

4. In a mold engraving machine, a rotatable work support, a rotatable pattern disc having a peripheral edge forming an abutment surface, means for simultaneously rotating said disc and work support, a tool support having a mounting tiltable relative to said work support, a follower supported for movement relative to said disc, and means for simultaneously tilting said tool support and moving said follower to enable the maintenance of the follower in contact with the abutment surface of the disc during the rotation thereof.

5. In a mold engraving machine, a rotatable work support, a rotatable pattern disc having a tortuous peripheral edge forming an abutment surface, means for simultaneously rotating said disc and work support, a tool support having a mounting tiltable relative to said work support, a follower mounted for movement toward and away from the center of said disc, and means for simultaneously tilting said tool support and moving said follower to enable the maintenance of the follower in contact with the abutment surface of the disc during the rotation thereof.

6. In a mold engraving machine, a rotatable work support, a rotatable pattern disc having a tortuous peripheral edge forming an abutment surface, means for simultaneously rotating said disc and work support, a tool support having a mounting tiltable relative to said work support, a follower mounted for movement toward and away from the center of said disc, means for simultaneously tilting said tool support and moving said follower to enable the maintenance of the follower in contact with the abutment surface of the disc during the rotation thereof, and means spaced from the periphery of the disc to limit the movement of the follower away from the center of the disc.

7. In a mold engraving machine, a rotatable work support, a rotatable pattern disc having a tortuous peripheral edge forming an abutment surface, means for simultaneously rotating said disc and work support, a tool support having a mounting tiltable relative to said work support, a follower mounted for movement toward and away from the center of the disc, means for simultaneously tilting the tool support and moving the follower to enable the maintenance of the follower in contact with the abutment surface of the disc during the rotation thereof, and a ring member outwardly spaced from the periphery of the disc having an abutment surface for limiting the movement of the follower away from the center of the disc.

8. In a mold engraving machine, a rotatable work support, a rotatable pattern disc having a tortuous peripheral edge forming an abutment surface, means for simultaneously rotating the disc and work support, a tool support having a mounting tiltable relative to said work support, a follower mounted for movement toward and away from the center of the disc, means for simultaneously tilting the tool support and moving the follower to enable the maintanenance of the follower in contact with the abutment surface of the disc during the rotation thereof, and a ring member outwardly spaced from the periphery of the disc having an abutment surface for limiting the movement of the follower away from the center of the disc, said ring being concentric of the disc.

In testimony whereof I have hereunto subscribed my name.

JOHN C. JENNEJOHN.